3,136,732
THERMOSETTING PAVING MATERIAL
Arnold M. Kaestner, Cranford, and Hugh Frederick Whitney, Jr., Summit, N.J., assignors to Esso Research and Engineering Company, a corporation of Delaware
No Drawing. Filed Oct. 7, 1960, Ser. No. 61,079
6 Claims. (Cl. 260—33.6)

This invention relates to the preparation of non-asphaltic paving compositions and more particularly to a process whereby such paving compositions can be mixed and spread at ambient temperatures.

Conventional asphalt paving is normally made by mixing the asphaltic binder with graded aggregate at elevated temperatures. However, such asphaltic paving compositions have not been satisfactory for use where fuel and oil spillage are common, such as, for example, in maintenance areas, toll booths, parking lots, service stations, and in airports surfacing, particularly where jet planes are used. It is known that jet fuel which inadvertently spills on the runways attacks conventional asphalt surfaces with the result that softening, pitting and cracking occurs. Also, the intense heat from the jet exhausts adversely affects the surface. Hence, it is necessary for these surfaces to be both resistant to jet fuel and high temperatures, and also to possess a rubber like resiliency which can withstand the excessively high compressive strain of heavy jet aircraft.

Recently the incorporation of thermosetting polymers into asphalt has been used to impart increased strength properties and resistance to deterioration from fuel spillage and from the hot blasts of jet engine exhausts. However, since the rate of reaction of the chemical components in these asphaltic compositions varies directly with temperature, the systems are difficult to control, particularly at the elevated temperatures normally employed for asphaltic compositions. Ideally, a constant temperature operation where the temperature is ambient would eliminate the necessity for providing heat to the mixture and provide a system whereby accurate control of the setting or curing rate is possible.

Applicants have discovered that when polyol is mixed with a polyisocyanate in the presence of a catalyst and in the presence of conventional aggregates, the mixing can be carried out, and the resulting paving composition spread, at ambient temperatures. The paving composition sets quickly, can be controlled, and possesses excellent jet fuel and oil resistance, high Marshall stability, and a rubber-like resiliency. Furthermore, these compositions can be mixed with extender oils and/or colored pigments.

The "setting" of the above paving composition takes place when the polyol reacts with the polyisocyanate in the presence of the catalyst to form a class of polymers known as polyurethanes. When this reaction takes place in the presence of the aggregates to be bonded, very high strength compositions result.

Polyurethane polymers are, of course, known to the art. U.S. Patent 2,374,136 to Henry S. Rothrock discloses a process for forming the polyurethane using a temperature of at least 100° C. However, the instant process surprisingly can be used at ambient temperatures. Also, the mixing of the components of the polymer, or a prepolymer adduct, is carried out in the presence of aggregate to provide the unusually high strength paving compositions of the invention.

U.S. Patent 2,902,388 to Waclaw Szukiewicz describes a method for bonding a hydraulic cement-polyurethane resin composition to a surface by applying a mixture of hydraulic cement with an adduct of a polyol and an organic polyisocyanate in a volatile organic solvent in the presence of a resin-forming catalyst, followed by evaporation of the solvent. The instant process has a number of advantages over the above process in that aggregates are employed to provide the necessary paving strengths, hydraulic cement is not required, and an organic solvent is not used, eliminating the expense and ignition hazards associated therewith.

The polyols used as a starting material in the instant compositions are aliphatic polyols containing from 2 to 5 hydroxy groups and from 4 to 57 carbon atoms, such as butane diol, polypropylene glycol, polyethylene glycol, poly (butylene glycol), poly (styrene glycol), pentaerythritol, polyhydroxy esters, and the like. The polyhydroxy esters are aliphatic esters of aliphatic mono- or polycarboxylic acids having from 2 to 18 carbon atoms and from 1 to 2 carboxyl groups therein such as phthalic, adipic, sebacic, succinic, oxalic, ricinoleic and the like. Castor oil, which is basically a trihydroxy ester, is particularly preferred for use in the instant compositions. Mixtures of polyols may be used to obtain "tailor-made" polyurethanes.

The polyisocyanate component of the instant compositions are aromatic or aliphatic polyisocyanates having from 2 to 5 isocyanate groups. Examples of these include tolylene diisocyanate (Desmodur T), which is highly preferred for use in the instant invention; hexamethylene diisocyanate (Desmodur H); diphenylmethyl diisocyanate (MDI) and the dimethyl derivative; 1.5 naphthalene diisocyanate (NDI) (Desmodur 15); triphenylmethane triisocyanate (Desmodur R); xylylene diisocyanate (SCI) and the dimethyl derivative (TODI); polymethylene polyphenyl isocyanate (PAPI); and chlorophenylene-2,4-diisocyanate-(Desmodur C). The names in parenthesis indicate the German nomenclature.

One or more polyols can be used with one or more polyisocyanates. For example, a mixture of castor oil and glycerol may be reacted with 2,4 tolylene diisocyanate and 2,6 tolylene diisocyanate.

The catalysts used in the instant process are metal naphthenates. The metal component can be mercury, bismuth, tin, lead, chromium, antimony, tungsten, manganese, iron, cobalt, nickel and the like. Most metal naphthenates are more or less useful as catalysts in the instant invention, although mercury is preferred.

The aggregates to be used according to the invention are inert inorganic solids of numerous conventional types or certain specially adapted types, as will be discussed further herebelow. For thin sections or surface layers, e.g., about $\frac{1}{16}''$ to $\frac{1}{2}''$ or so, a fine aggregate should be used, such as a sand having a grading of about $\frac{1}{4}''$ down to 100 mesh, or a finer sand ranging from 8 mesh to 100 mesh may be used; or even finer fractions may be used, such as 20 mesh to 100 mesh, and with any of these, some powdered filler may be used, such as ground limestone, pulverized sand, silicas, clays, etc. By "fine" aggregate is meant an aggregate having a particle size of from $\frac{1}{4}''$ to 100 mesh. By "powdered filler" is meant a filler having a particle size of 100 mesh, or less ranging down to 10 mµ in particle diameter. For some purposes, these fine fillers may be used without any fine or coarse aggregates. For paving uses, filler is normally considered as 95% passing 200 mesh. On the other hand, for coarser sections, slabs or bulk articles, e.g., from ½" to 1 foot, or 5 feet or more in thickness, with or without an overlying finer surface coating, large crushed aggregates may be used, such as crushed stone, gravel and air-cooled slag, having either a mixed grading of ½" to 3", or ¼" to 2" or ½" to 1", etc. Alternatively, if a fairly thick section, e.g. 2" to 1 foot or more is to be used without any finer surface coating, the aggregate used may be composed of both coarse and fine aggregate and may includes a dust filler, such as a mixture of 100 parts by weight of coarse stone, 80 parts by weight of sand, and 4 to 5 parts by weight of powdered limestone. The above aggregates may be graded either for density and lowest voids, or for a controlled desired amount of voids, e.g., 3%, 5%, 8%, etc. voids. By "coarse" aggregate is meant an aggregate having a particle size of from ¼ to ¾ inch.

Cinder-like aggregates are not useful in the present compositions since they are not as strong as and require more polyisocyanate binder than the solid-type aggregates used in the invention.

If desired, the powdered fillers, to be used, e.g., crushed silicas, clays, ground limestone, or even carbon black, etc. may be subjected to severe attrition, e.g. by ball-milling with steel balls, or roll-milling one or several times through tight set steel rolls, or stamping or any other severe attrition. It has been found that such severe attrition activates the surface of the filler particles at the places where the particles have been broken or otherwsie attrited.

Since isocyanates react readily with water to form undesirable $CO_2$ and ureas, the system must be free of water. Water content of aggregate is presently required to be less than 0.25 wt. percent. Various adsorbents such as fuller's earth, silica gel, $P_2O_5$, etc. can be used in small quantities to remove some of this water, but pre-drying of the materials is preferred.

It was found that sand components of the aggregates were responsible for erratic catalyst behavior. It was found that salt residues, which are frequently present in various concentrations in sand, were acting as a catalyst poison, i.e. both delaying the cure and changing the rates of the reactions involved. Accordingly, it is important in the practice of this invention that all aggregate components be substantially salt-free.

The paving compositions of the invention are prepared by mixing together at ambient temperatures the following components in conventional mixing equipment such as cement mixers and asphalt pug mixers.

| Component: | Parts by weight |
|---|---|
| Polyol | 2.4 to 10.8, preferably 2.4 to 5.0. |
| Polyisocyanate | 0.6 to 2,4, preferably 0.6 to 1.3. |
| Total aggregate | 88 to 94, preferably 91 to 94. |
| Metal naphthenate catalyst (25% metal) | 0.001 to 1.0, preferably 0.01 to 0.15. |
| Optionally: | |
| Extender oils | 0.1 to 7.2, preferably 1.8 to 6.0. |
| Pigments | 0.1 to 1.0, preferably 0.25 to 0.5. |

The extender oils that can be used in the above compositions are low viscosity, non-asphaltic, non-volatile aromatic oils having a viscosity below 250 SUS @ 210° F. and a boiling point greater than 500° F., and an aromatics content by silicia gel preferably greater than 65%. Examples of useful extender oils which can be used alone or in mixtures include hydrofined phenol extracts of lubricating oil petroleum fractions in a viscosity range of 38–250 SUS @ 210° F. such as 75–X extract from coastal distillates. As stated above, the use of these oils is optional, but their use is preferred since they are inexpensive and can be used in relatively large quantities without resulting in any significant loss in composition properties.

A great advantage of the present invention is that the bonded aggregate compositions of the invention are all pale yellow or light grey to essentially colorless, i.e. a Gardner color as light as or lighter than 15, and therefore they can easily be given any desired color by adding a relatively small amount of a pigment. For instance, for a white, or light gray, a few parts of white titanium dioxide pigment may be used. For other purposes, red, yellow, orange, green, blue, or even black pigments may be used, as for identifying traffic guides or certain areas of paving, etc.

Several techniques may be used to form the polyurethanes in the presence of the aggregates. In general, the components of the compositions can be added to the mixing equipment simultaneously, or in any desired order. It is important, however, to have the aggregate and other inert components present before the polymerization begins. This is achieved by not allowing the catalyst to remain in contact with either the prepolymer adduct or the polyol-polyisocyanate mixture for any appreciable time in the absence of the other components of the final composition desired. For example, a prepolymer may be formed from the polyol and the polyisocyanate first, and then, after blending with the aggregate, catalyst, and other components, the polymerization can be completed by curing with more polyol. Alternatively, the comonomers can be mixed with the aggregate prior to the addition of the catalyst.

The prepolymer route discussed above (1) aids the formation of more uniform polymers and (2) is less toxic and safer to handle than the pure polyisocyanates. However, primarily for economic reasons, it is preferred to add the binder as two components, i.e. extender-polyisocyanate solution and castor oil-catalyst blend.

The prepolymer is formed by reacting an excess of polyisocyanate with polyol at temperatures at or below 50° C. without a catalyst. This serves to pre-react all of the hydroxyl groups and leave an isocyanate-terminated, low-molecular weight linear polymer.

The invention will be better understood with reference to the following examples, which are merely given to illustrate the invention and are not meant to limit the invention.

EXAMPLE 1

To demonstrate the commercial practicability of the instant invention, two tons of the following paving mix were produced in a commercial plant and laid as a road surface. The procedure used was as follows: 136.5 lbs. of aromatic extender (75–X extract) and 24.7 lbs. of tolylene diisocyanate (Nacconate 80) were added to 3740 lbs. of paving aggregate in a mix plant pug mill. The aggregate had the following compositions:

35% ⅛" to ⅝" traprock
57% concrete sand
8% limestone filler

The temperature of the aggregate (ambient) was 90° F. The mixing was continued and 98.8 lbs. of castor oil, 0.86 lb. of mercury naphthenate (25% metal), and 4.6 lbs. of blue pigment were added and the mixing continued for 2½ minutes. The resulting mixture was then transported to the paving site, distributed, and rolled. After the pavement set which took about three days, it was open to traffic and after four months is still in perfect condition.

Typical physical properties of the polyurethane binder and the above paving mix containing about 50% extender, based on the weight of polyisocyanate polymer, are compared with asphalt as follows:

|  | Polyurethane system | Conventional asphalt |  |  |
|---|---|---|---|---|
| Binder: |  |  |  |  |
| Color | Pale amber | Black. |  |  |
| Softening pt., °F | Does not melt | 120. |  |  |
| Penetration/77° F | 55 | 90. |  |  |
| Solubility, loss in mils by washing in jet fuel for 15 min. | 3 | 80. |  |  |
|  | Stab. | Flow | Stab. | Flow |
| Paving mix: |  |  |  |  |
| Marshall stability/140° F | 5,500 | 8 | 1,500 | 10 |
| Marshall stability/77° F | 11,000 | 12 | 6,000 | 14 |
| Marshall stability/32° F | 14,500 | 15 | 29,000 | 15 |
| Marshall stability/140° F. after 24 hrs. soaking in jet fuel | 5,500 | 8 | Disintegrated | |

*Oil Resistance Test of Polyurethane-Paving Mixes*

Duplicate briquettes compacted according to Marshall method were weighed to nearest 0.5 gram and then submitted to the spray of jet fuel from an oil burner nozzle operating at 80 p.s.i.g. and discharging 2.5 g.p.h. At one hour intervals the specimens were withdrawn from the spray and immediately hand brushed 50 strokes with a wire brush. The specimens were then reweighed, and returned to the test apparatus for more spraying.

When compared with asphalt mixes, the solvent resistance of polyurethane mixes was demonstrated.

| Hours | Grams surface loss per 12½ in.² | |
|---|---|---|
|  | Asphalt | Polyurethane system |
| 2 | 68 | 1½ |
| 3 | 100 | 2 |
| 6 | | 3½ |
| 9 | | 5 |

JP-4 jet fuel used.

EXAMPLE 2

Two tons of the following paving mix were produced in a commercial plant and laid as a road surface approximately 1" thick. The procedure used was as follows: 120 lbs. of aromatic oil extender with a viscosity of 220 centipoises at 80° F. produced by blending 60 lbs. of hydrofined 75-X extract and 60 lbs. 900-X hydrofined extract, and 36 lbs. of tolylene diisocyanate (Nacconate 80) were added to 3700 lbs. of aggregate in a mix plant pug mill. The aggregate had the following composition:

32% ⅛" to ¼" traprock
57% gravel sand washed
11% limestone filler

The mixing was continued and 144 lbs. of castor oil, 2¾ lbs. of mercury naphthenate, and 20 lbs. of yellow iron oxide pigment were added and the mixing continued for a total of 4 minutes from starting. The resulting mix, at a temperature of 100° F., was then transported to the paving site, distributed, and rolled with conventional equipment. After the pavement set which took as predicted, only 90–100 min., the road was opened to traffic and after two months is still performing in a satisfactory manner.

Modifications of the above process can be carried out without departing from the scope and spirit of the invention.

What is claimed is:

1. A process which comprises preparing a mixture of from 0.1 to 7.2 parts of a low viscosity, non-asphaltic, non-volatile aromatic oil and from 0.6 to 2.4 parts of a polyisocyanate having from 2 to 5 isocyanate groups per molecule, admixing, at ambient temperatures, said oil-polyisocyanate mixture then being admixed with from 88 to 94 parts of an inert inorganic solid paving aggregate, thereafter adding to the admixture, at ambient temperatures, from 2.4 to 10.8 parts of an aliphatic polyol containing from 2 to 5 hydroxyl groups and from 4 to 57 carbon atoms per molecule and from 0.001 to 1.0 part of a metal naphthenate, forming the resultant mixture and allowing the same to set and harden under the conditions obtaining.

2. A process as in claim 1 wherein from 0.1 to 1.0 part of a colored pigment is added to the admixture prior to forming the resultant mixture.

3. A process as in claim 1 wherein the metal naphthenate is mercury naphthenate.

4. A process as in claim 1 wherein the polyol is castor oil.

5. A process as in claim 1 wherein the polyisocyanate is tolylene diisocyanate.

6. A process as in claim 1 wherein the aggregate comprises about 32% of ⅛ inch to ¼ inch traprock, about 57% washed gravel sand, and about 11% of limestone filler.

References Cited in the file of this patent

UNITED STATES PATENTS

| 2,374,136 | Rothrock | Apr. 17, 1945 |
| 2,925,831 | Welty | Feb. 23, 1960 |

FOREIGN PATENTS

| 834,147 | Great Britain | May 4, 1960 |